United States Patent
Ziaylek et al.

(10) Patent No.: US 7,950,532 B2
(45) Date of Patent: May 31, 2011

(54) BRACKET ASSEMBLY FOR POSITIVELY ENGAGING A HELMET

(75) Inventors: Michael P. Ziaylek, Yardley, PA (US); W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 73 days.

(21) Appl. No.: 12/589,212

(22) Filed: Oct. 20, 2009

(65) Prior Publication Data

US 2010/0123064 A1 May 20, 2010

Related U.S. Application Data

(60) Provisional application No. 61/199,320, filed on Nov. 14, 2008.

(51) Int. Cl.
 *A47F 7/06* (2006.01)
(52) U.S. Cl. ........... 211/30; 211/32; 211/31; 211/87.01; 211/86; 211/87; 248/309.1; 248/304; 248/317; 248/339
(58) Field of Classification Search .............. 248/309.1, 248/304, 205.1, 220.21, 317, 339; 211/30, 211/31, 32, 95, 86, 87, 87.01, 113
See application file for complete search history.

(56) References Cited

U.S. PATENT DOCUMENTS

| | | | |
|---|---|---|---|
| 4,821,891 A | 4/1989 | Williams | |
| 4,975,980 A | 12/1990 | Ersteniuk | |
| 5,121,508 A * | 6/1992 | Grilliot et al. | 2/421 |
| D357,842 S | 5/1995 | Cohrs | |
| 5,411,144 A | 5/1995 | Deupree | |
| 5,538,144 A * | 7/1996 | Reed | 211/32 |
| 6,212,688 B1 | 4/2001 | Leslie | |
| 6,439,404 B1 * | 8/2002 | Steeg | 211/87.01 |
| 6,478,025 B1 | 11/2002 | Yort et al. | |
| D494,049 S * | 8/2004 | Ziaylek et al. | D8/373 |
| 6,776,453 B1 | 8/2004 | Floyd, Jr. | |
| 7,168,577 B1 * | 1/2007 | Moseley | 211/32 |
| 7,273,153 B1 | 9/2007 | Kuniyoshi | |
| 2003/0188448 A1 | 10/2003 | Reed | |
| 2009/0283485 A1 * | 11/2009 | Anderson | 211/85.3 |

* cited by examiner

*Primary Examiner* — Terrell Mckinnon
*Assistant Examiner* — Todd M. Epps
(74) *Attorney, Agent, or Firm* — Sperry, Zoda & Kane (57) ABSTRACT

A mounting bracket configuration with two lower mounting locations and an optional upper mount and a flexibly resilient securement strap attachable thereto to securely retain a helmet such as those used by firefighters securely in place against a mounting surface such as the interior of the passenger compartment of an emergency vehicle, such as a fire truck. The present apparatus also includes a bumper construction for protecting a user from being injured by the protruding upper hook while also preventing damaging of the helmet itself during mounting or removal. A release lanyard provided for easy release and engagement. The upper hook can attach to a fire helmet directly and/or to the securement strap.

20 Claims, 5 Drawing Sheets

BRACKET ASSEMBLY FOR POSITIVELY ENGAGING A HELMET

The present utility application hereby formally claims priority of U.S. Provisional Patent application No. 61/199,320 filed Nov. 14, 2008, on "BRACKET ASSEMBLY FOR POSITIVELY ENGAGING A HELMET" filed by the same inventors listed herein, namely, Michael P. Ziaylek and W. Brian McGinty, and assigned to the same assignee, namely Michael P. Ziaylek, said referenced provisional application is hereby formally incorporated by reference as an integral part of the present application.

BACKGROUND OF THE INVENTION

1. Field of the Invention

The present invention pertains to the field of racks or hooks for retaining protective headgear such as helmets with respect to a mounting surface, and, particularly, positively engaging such helmets in place to prevent damage thereto resulting from movement thereof about the interior of the passenger compartment of a moving motor vehicle and possible injury to personnel therein. A specific use for such a bracket assembly is within the passenger compartment of fire trucks where a plurality of heavy helmets are often mounted prior to donning by emergency personnel traveling within the emergency vehicle to an emergency situation such as an active fire. Such helmets are commonly particularly heavy and include various constructions and protruding portions designed to protect a user which can injure firefighters if the helmet becomes loose while traveling in the emergency vehicle. For this reason, the present invention provides a means for preventing the helmet from being jarred by positively engaging it with respect to a mounting location within the fire truck or other emergency to vehicle while at the same time allowing it to be quickly mounted or removed from the bracket.

2. Description of the Prior Art

Many helmet or headgear mounting hook configurations for various purposes that have been patented such as U.S. Pat. No. 4,821,891 patented Apr. 18, 1989 to Kenneth A. Williams and assigned to Utopia International on a "Shape Saving Hat Rack"; and U.S. Pat. No. 4,975,980 patented Dec. 11, 1990 to Stephen R. Ersteniuk on a "Protective Helmet For Firefighters"; and U.S. Pat. No. 5,121,508 patented Jun. 16, 1992 to William L. Grilliot et al on a "Firefighter's Helmet Having Head Securing Means"; and U.S. Design Pat. No. 357,842 patented May 2, 1995 to Kenneth O. Cohrs on a "Blocking Hat Rack"; and U.S. Pat. No. 5,411,144 patented May 2, 1995 to David W. Deupree on a "Hat Rack"; and U.S. Pat. No. 6,212,688 patented Apr. 10, 2001 to Henry E. Leslie on a "Firefighter's Glove Holder"; and U.S. Pat. No. 6,478,025 patented Nov. 12, 2002 to Jerry D. Yort et al and assigned to Tayco on a "Firefighting Hood and SCBA Face Mask System"; and United States Patent Publication No. 2003/0188448 published Oct. 9, 2003 to Michael J. Reed on a "Breathable Rack For Storing Helmets And The Like; and U.S. Pat. No. 6,776,453 patented Aug. 17, 2004 to Franklin B. Floyd, Jr. and assigned to Reliable Constructions Heaters, Inc. on a "Seating Device Having A Helmet Heating Rack"; and U.S. Pat. No. 7,273,153 patented Sep. 25, 2007 to Brian M. Kuniyoshi on a "Baseball Bat And Helmet Rack".

SUMMARY OF THE INVENTION

The present invention provides a mounting bracket assembly for positively retaining a helmet, and is particularly usable with those specific helmets which have an integrally configured mounting loop often mounted on the brim or outer portion of the helmet to facilitate hanging thereof upon hooks.

The assembly includes a main bracket including a main vertical upright extending generally vertically. This main vertical upright will define an upper end and a lower end, as well as an upright mounting surface for abutment with the environmental structure responsive to the mounting bracket assembly being secured thereto, and a helmet securement surface for receiving a helmet in abutment therewith responsive to retaining thereof by the mounting bracket assembly. The upright mounting surface and the helmet securement surface are preferably oriented facing opposite with respect to one another. Also, the main vertical upright is preferably planar, but can include an oblique section as will be described below.

A lower cross member is attached with respect to the main vertical upright and extends laterally outwardly therefrom. The lower cross member defines a first lateral end and a second lateral end spatially disposed from one another. The first lateral end defines a first lateral attachment slot, and the second lateral end defines a second lateral attachment slot preferably.

A mounting hook may be attached with respect to the upper end of the main vertical upright to extend upwardly and inwardly therefrom to facilitate hooking engagement therewith. The mounting hook is attached to the upper end of the main vertical upright at a position immediately adjacent to a helmet mounting loop responsive to the use with a helmet having a helmet mounting loop being selectively secured in abutment with respect to the helmet securement surface. This mounting hook will be adapted to receive the helmet mounting loop secured thereto to further facilitate positive engagement of the helmet with respect to the main bracket.

A first ear plate will be attached to the upper end of the main vertical upright and will extend laterally outwardly therefrom, and upwardly adjacent to the mounting hook. A first bumper means which is preferably rubber will be attached to the first ear plate and will extend inwardly therefrom beyond the inward position of the inwardly extending mounting hook for enhancing protection therefrom.

Similarly, a second ear plate will be attached to the upper end of the main vertical upright and will extend laterally outwardly therefrom and upwardly adjacent the mounting hook in a direction oppositely oriented from the first ear plate to facilitate positioning of the mounting hook therebetween. Also, a second bumper which is preferably of a rubber material will be attached to the second ear plate and will extend inwardly therefrom beyond the inward position of the inwardly extending mounting hook for enhancing protection thereof.

A securement strap assembly will also be included in the present invention which is attachable to the main bracket. This securement strap assembly will include a primary loop positionable extending around the helmet for positively engaging thereof. The primary loop will be formed of a flexibly resilient material to facilitate biasing engagement of a helmet in abutment with respect to the helmet securement surface. A first attachment strap will also be included attached to the primary loop and attached to the first lateral end of the lower cross member to facilitate selective abutment of the helmet against the helmet securement surface to facilitate engagement thereof with respect to the main bracket. The first attachment strap will extend through preferably a first lateral attachment slot to facilitate securement thereof with respect to the first lateral end of the lower cross member. The first attachment strap will be integrally formed with respect to at least a portion of the primary loop.

In a similar manner, a second attachment strap will be attached to the primary loop at a position thereon which is spatially disposed from the first attachment strap. This second attachment strap will be attached to the second lateral end of the lower cross member in order to facilitate selective abutment of the helmet against the helmet securement surface in order to facilitate engagement thereof with respect to the main bracket. This second attachment strap will extend through the second lateral attachment slot to facilitate securement thereof with respect to the second lateral end of the lower cross member. The attachment strap will preferably integrally form with respect to at least a portion of the primary loop means.

A strap mounting loop will preferably be included and preferably will be formed by the metallic material such that it is attached to the primary loop of the securement strap assembly. This strap mounting loop will be engageable with respect to the mounting hook of the main bracket to further facilitate secure mounting of a helmet in abutting engagement with respect to the helmet securement surface. The primary loop of the securement strap will be formed preferably of a flexibly resilient material such as an elastomeric material possibly to facilitate biasing engagement of the helmet in abutment with respect to the helmet securement surface. The mounting hook is also adapted to receive the strap mounting loop and the helmet mounting loop in engagement simultaneously therewith in order to positively locate the helmet in abutting engagement with respect to the helmet securement surface.

The present invention may further include a mounting lanyard attached to the primary loop for the purpose of facilitating movement of the primary loop into supporting engagement with the helmet for retaining thereof in abutment with the helmet securement surface. Furthermore, a first adjustable buckle may be attached to the first attachment strap to facilitate adjusting the length of the first adjustment strap to facilitate use with helmets of various sizes and configurations. A second adjustable buckle will be attached to the second attachment strap to facilitate adjusting the length of the second attachment strap to further facilitate use with helmets of various sizes and configurations.

It should be appreciated that in some configurations of the present invention the main vertical upright of the main bracket will not be planar. In those configurations, the main vertical upright will include an upwardly and inwardly extending oblique section to facilitate positioning of the mounting hook, the first ear plate and the second ear plate upwardly and inwardly with respect to the lower end of the main vertical upright to facilitate use of helmets having various configurations, and particularly those with protruding constructions in the interior thereof which may need additional clearance between the mounting hook and the helmet for items such as size adjustment devices or interior liner configurations.

With the configuration utilizing the oblique section, the main bracket will preferably include a first mounting shoulder fixedly secured to the first ear plate and extending outwardly therefrom to facilitate secure mounting with respect to environmental structure. The first mounting shoulder will preferably define a first shoulder mounting aperture defined therein to facilitate this mounting.

Similarly, the main bracket may include a second mounting shoulder fixedly secured to the second ear plate and extending outwardly therefrom to further facilitate secure mounting thereof with respect to environmental structure. This mounting is further facilitated by configuring the second mounting shoulder such that it defines a second shoulder mounting aperture defined thereon to facilitate mounting thereof to the environmental structure.

It is an object of the bracket assembly for positively engaging a helmet of the present invention to provide a construction wherein large and/or heavy helmets can be securely mounted to a retaining hook at various locations, and specifically, within an emergency vehicle.

It is an object of the bracket assembly for positively engaging a helmet of the present invention to provide a construction wherein a T-shaped main body includes a horizontal portion for providing arms for holding a retaining strap, and a vertical portion for providing a hook.

It is an object of the bracket assembly for positively engaging a helmet of the present invention to provide a construction wherein the number of moving parts is minimized.

It is an object of the bracket assembly for positively engaging a helmet of the present invention to provide a construction wherein maintenance requirements are minimized.

It is an object of the bracket assembly for positively engaging a helmet of the present invention to provide a construction wherein the hooking means is protected by protruding arms on both sides thereof to provide inadvertent injury to personnel thereadjacent.

It is an object of the bracket assembly for positively engaging a helmet of the present invention to provide a construction wherein a mounting strap is utilized which is preferably flexibly resilient to facilitate a flexibly resilient means of mounting of the helmet with respect to the mounting hook.

It is an object of the bracket assembly for positively engaging a helmet of the present invention to provide a construction wherein a uniquely configured hook configuration is provided having a lower outwardly protruding section and an upper vertically protruding section with hooking shoulders for positively engaging the upper portion of a helmet to facilitate securement thereof.

It is an object of the bracket assembly for positively engaging a helmet of the present invention to be useful with helmets of various size and configurations which may require usage of a bracket having including an oblique forwardly extending offset in the main bracket means to provide clearance for items protruding from the helmet such as helmet liners and adjustment mechanisms and the like.

BRIEF DESCRIPTION OF THE DRAWINGS

While the invention is particularly pointed out and distinctly described herein, a preferred embodiment is set forth in the following detailed description which may be best understood when read in connection with the accompanying drawings in which.

DETAILED DESCRIPTION OF THE PREFERRED EMBODIMENT

The present invention discloses a mounting bracket assembly which can be used to hold a helmet 10 fixedly secured thereto in a positively engaging manner. This apparatus is particularly useful for holding the helmets of firefighters within the passenger compartment of firefighting vehicles. Such helmets 10 are quite heavy, and if they become loose, they can hurt firefighting personnel or become damaged or damage the interior of the vehicle. Many of such helmets 10 will include a helmet mounting loop 12. The present invention is designed to be used with helmets 10 which include the helmet mounting loop 12 as well as those that do not include helmet mounting loop 12. With either configuration, the helmets can be fixedly secured to the mounting bracket assembly of the present invention.

The mounting bracket assembly of the present invention includes a main bracket means 11 which includes a main vertical upright 14 extending generally vertically and defining a portion in the upper section defined as the upper end 16, and a section defined in the lower portion defined as the lower portion 17.

Figure 1:
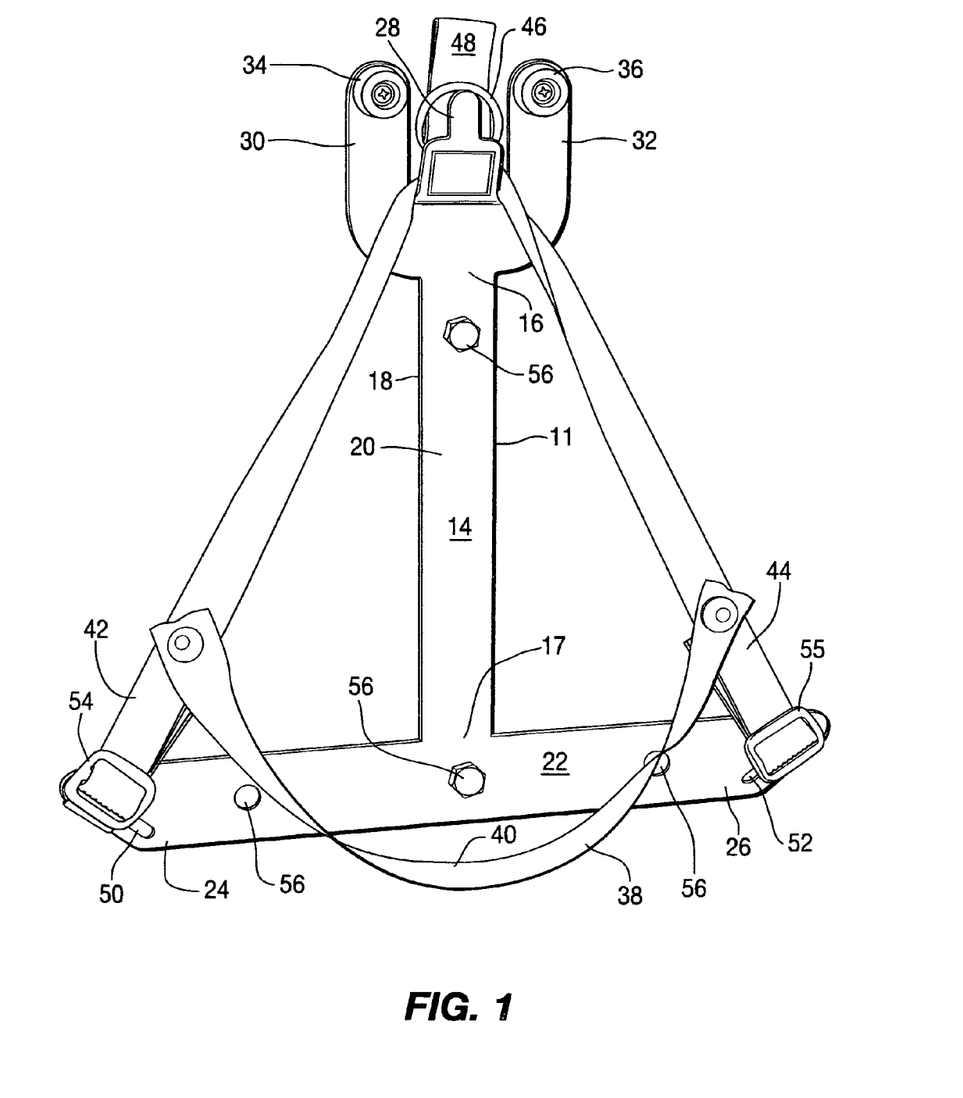
FIG. 1 is a front plan view of an embodiment of the mounting bracket assembly of the present invention having a planar main vertical upright shown in the engaged position.

Main vertical upright 14 includes an upright mounting surface 18 which is the obverse as viewed from FIG. 1. The upright mounting surface 18 is designed to be positioned in engagement with environmental structure such as the walls and interior of a firefighting vehicle passenger compartment to facilitate mounting thereof. This mounting can be facilitated by the defining of a plurality of mounting apertures 56 at some location of the main bracket 11.

The forwardly facing side of the main vertical upright is defined to comprise at least a portion of the helmet securement surface 20.

A lower cross member 22 will be secured to the lower end 17 of the main vertical upright 14, and the front surface thereof will further define the helmet securement surface 20, thus the helmet can be brought into abutment with the front surface of the lower cross member 22 and the upright mounting surface 18 of the main vertical upright 14 and be urged thereagainst for positive engagement therewith and thus be firmly held.

The lower cross member 22 preferably includes a first lateral end means 24 at one end thereof, and a second lateral end means 26 at the opposite end thereof. First lateral end means 24 will define a first lateral attachment slot means 50 therewithin to facilitate securement thereto, and a second lateral end means 26 will preferably define a second lateral attachment slot means 52 therein to facilitate attachment thereto.

A mounting hook 28 will extend upwardly from the upper end 16 of the main vertical upright 14 such that it extends upwardly and inwardly away from the mounting surface. This mounting hook 28 will be selectively engageable with respect to the securement strap assembly 38 or the helmet mounting loop 12 or the helmet 10 which is so configured to have such a mounting loop 12.

A first ear plate means 30 will extend upwardly in a direction laterally disposed from a planar with the main vertical upright 14. This first ear plate means 30 will include a first bumper means 34 preferably of a rubber material mounted thereon. Similarly, a second ear plate means 32 will extend laterally from the main vertical upright 14 and spatially disposed from the first ear plate means 30 in such a manner as to position the mounting hook 28 between the first ear plate means 30 and the second ear plate means 32. Second ear plate means 32 will include a second bumper means 36 thereon preferably of a rubber material which extends outwardly therefrom. Preferably, the first bumper means 34 and the second bumper means 36 will extend inwardly to a position beyond the inward most positioning of the mounting hook 28 for protection thereof to prevent helmets from scratching against the hook when the helmet mounting loop 12 is placed thereon, and also to prevent injury to personnel when walking past the apparatus of the present invention, or when placing or removing of the helmet with respect to this apparatus. The fact that the rubber bumpers 34 and 36 extend beyond the mounting hook 28 significantly enhances the safety aspects of use of the mounting bracket assembly of the present invention.

In a preferred configuration of the present invention, the securement strap assembly 38 will include a primary loop 40 adapted to extend circumferentially about a helmet 10 as it is positioned adjacent with the helmet securement surface 20. A first attaching strap 42 will be secured to the primary loop 40 and also will be attached to the first lateral end 24 of the lower cross member 22, preferably by extending it through a first lateral attachment slot 50 defined therein. Similarly, a second attachment strap will be secured to the primary loop at a position spatially disposed from the first attachment strap 42. This second attachment strap 44 will also be attached to the second lateral end 26 of the lower cross member 22 preferably by extending it through the second attachment slot 52 defined therein. To facilitate adjustability of the length of the first attachment strap 42, a first adjustable buckle 54 may be positioned therein. Similarly, a second adjustable buckle 55 may be positioned within the configuration of the second adjustment strap 44 to facilitate adjustability of the length thereof.

To facilitate maintaining positioning of the primary loop 40 of the securement strap assembly 38 in a position extending completely around a helmet 10, a strap mounting loop 46 will preferably be included. This mounting strap will preferably be of a metallic material, and will be adapted to engage the mounting hook 28 when a helmet 10 is positioned in abutment with the helmet securement surface 20, and the primary loop 40 extends completely therearound. This attachment is possible with helmet designs having the helmet mounting loop 12 or with helmet designs that do not include the helmet mounting loop 12. The configuration of the mounting hook 28 is such that it is capable of receiving the strap mounting loop 46 and the helmet mounting loop 12 simultaneously or merely receiving either one singly.

To facilitate movement of the primary loop 40 into a position surrounding the helmet 10, a mounting lanyard 48 may be included attached thereto. This provides an expedient means for manually moving the primary loop 40 for positioning it around the helmet 10 or moving it to a sufficient extent that the strap mounting loop 46 can be brought into engagement with the mounting hook 28, or disengage therefrom as may be needed.

Figure 2:
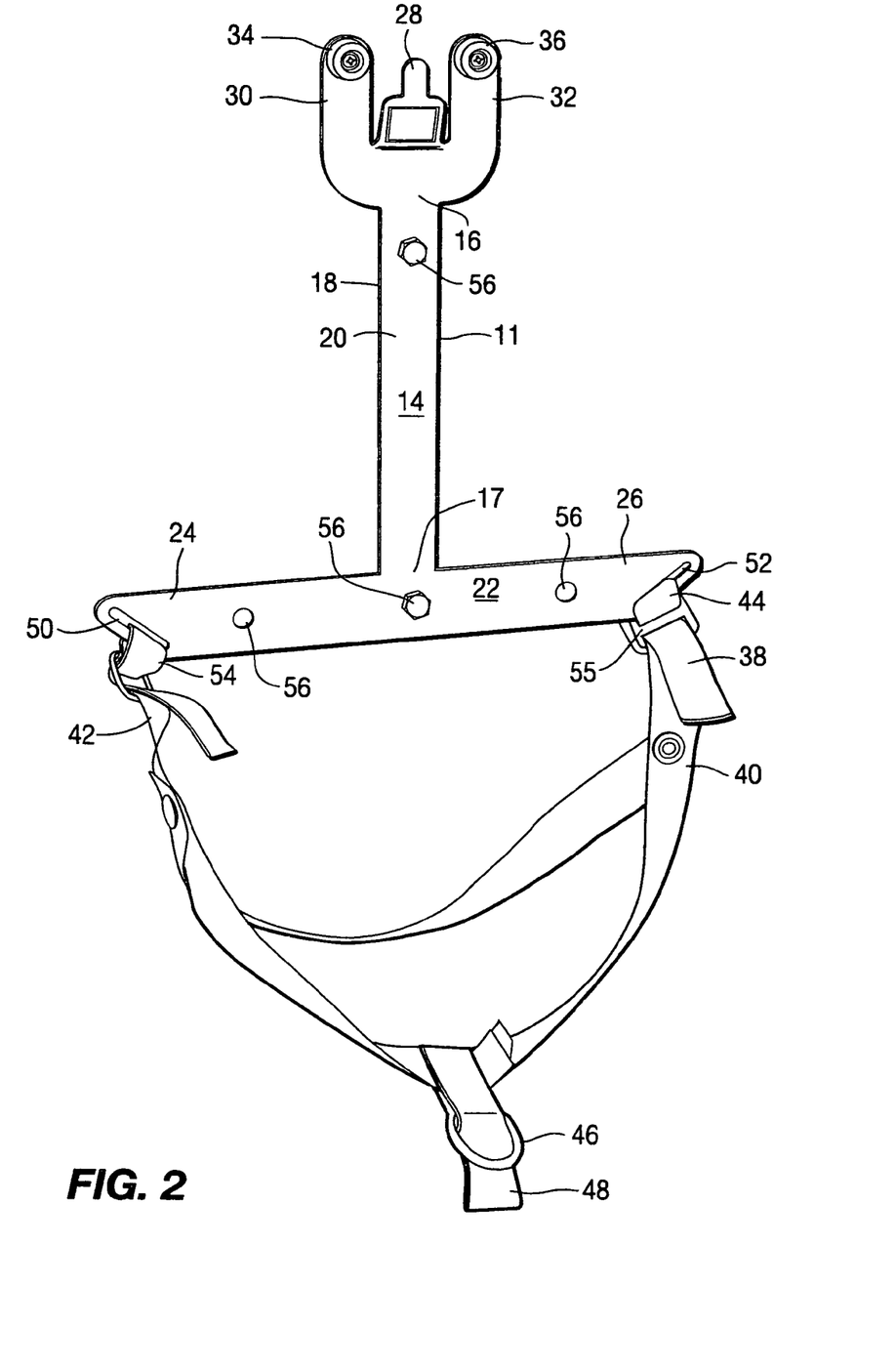
FIG. 2 is an illustration of the embodiment of FIG. 1 shown in the disengaged position.
Figure 3:
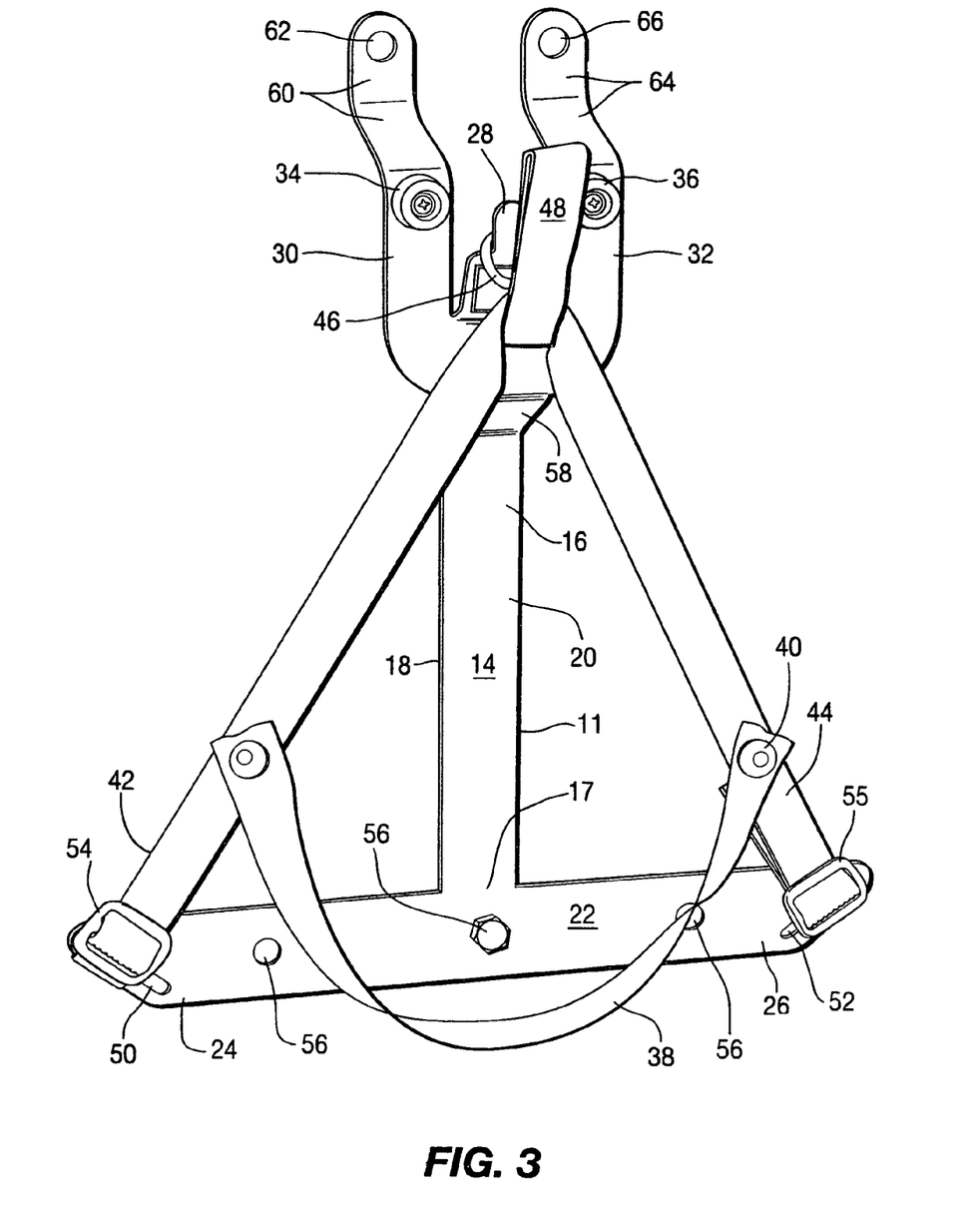
FIG. 3 is a front plan view of an alternative embodiment of the present invention showing the inclusion of an oblique section 58 in the main vertical upright, as well as the inclusion of a first mounting shoulder with aperture therein, and a second mounting shoulder with aperture therein in the engaged position.
Figure 4:
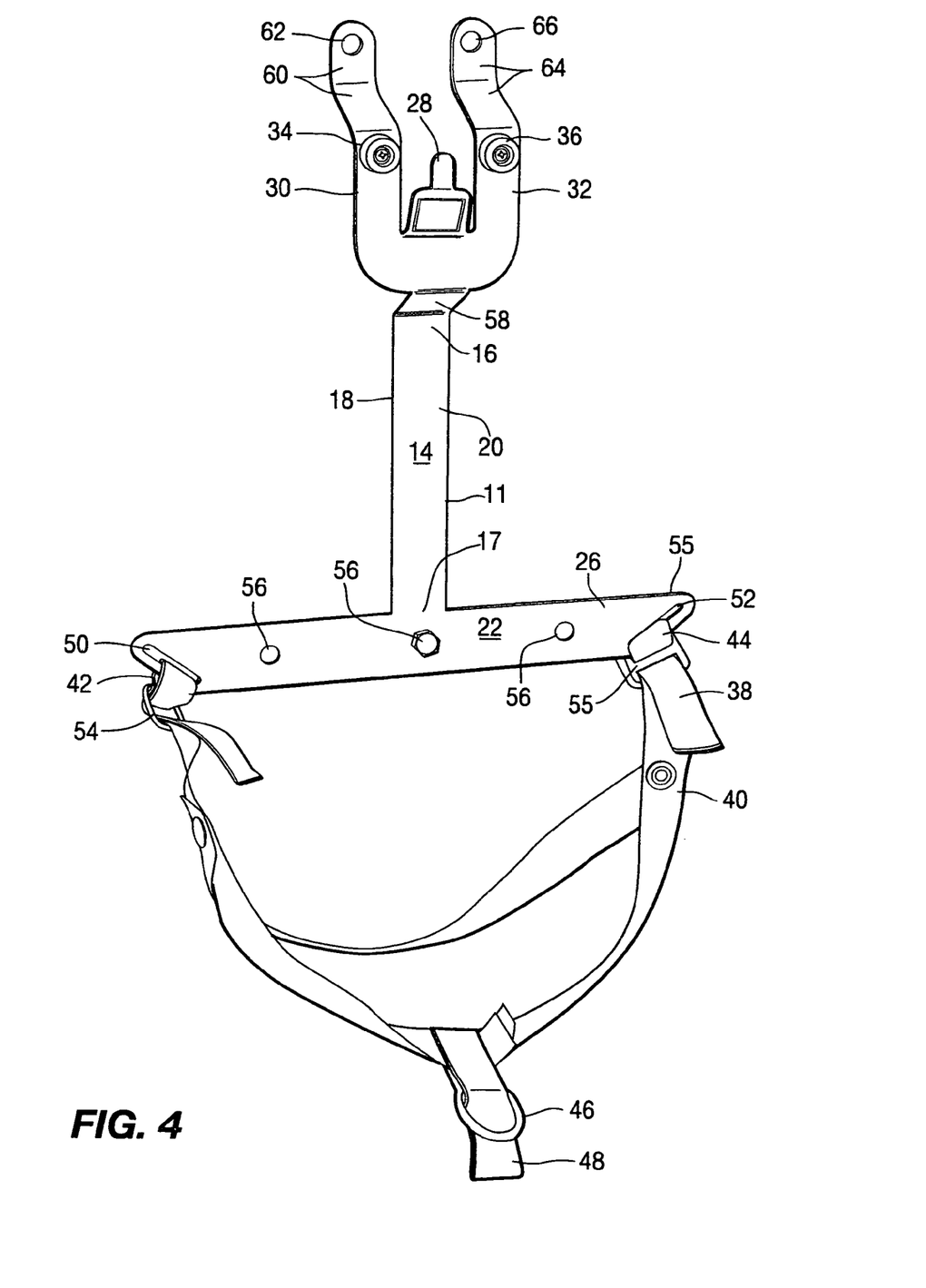
FIG. 4 is a front plan illustration of the embodiment shown in FIG. 3 in the disengaged position.
Figure 5:
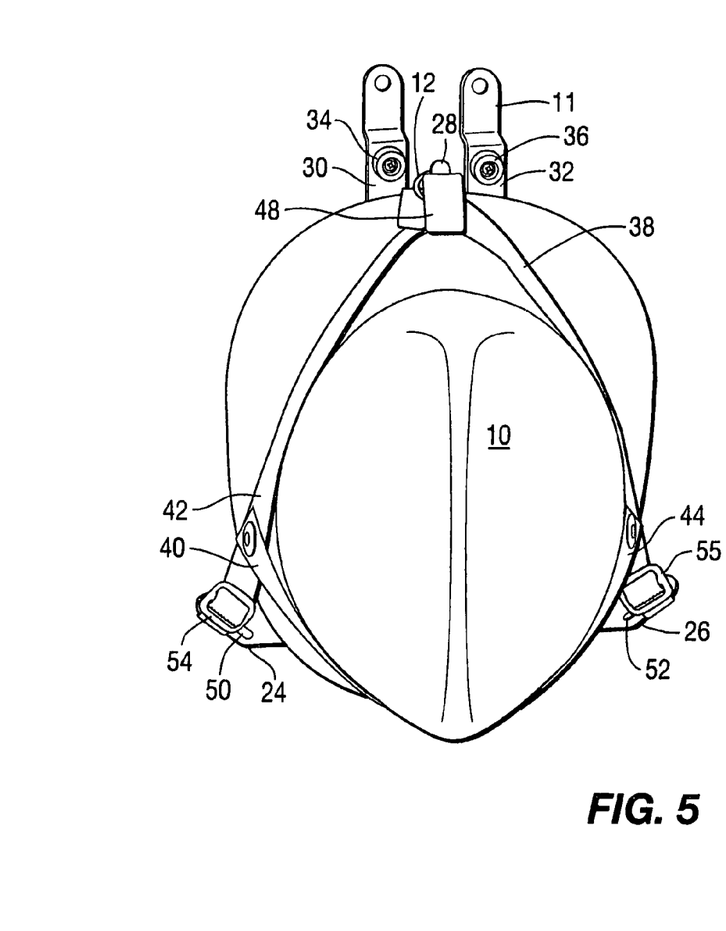
FIG. 5 is a front plan view of the embodiment shown in FIG. 3 showing a helmet held in position with respect to the helmet securement surface with a strap mounting loop in engagement with the mounting hook.
Figure 6:
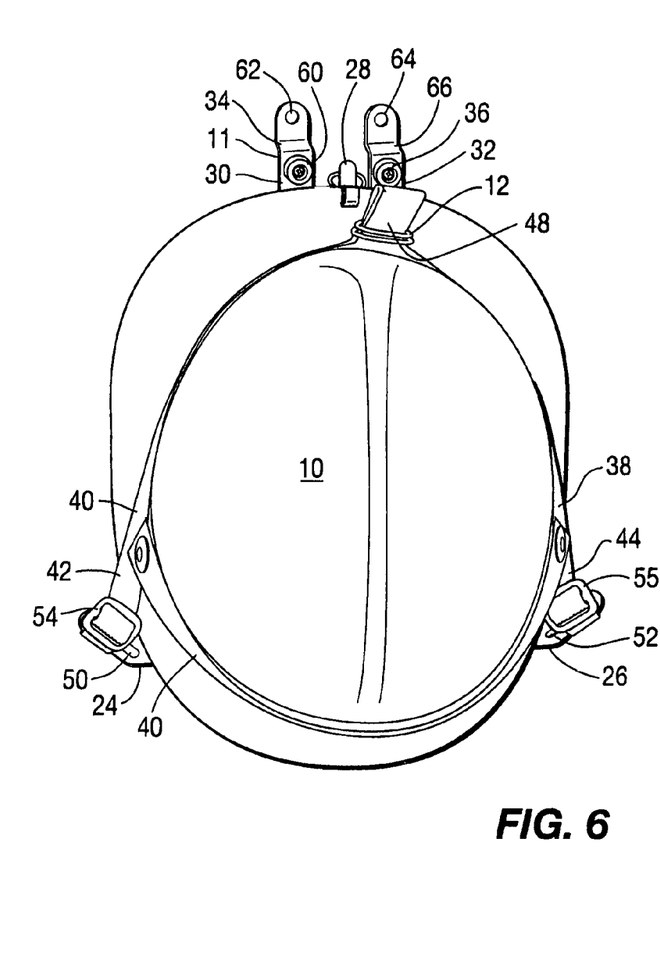
FIG. 6 is an illustration of the embodiment shown in FIG. 5 showing a helmet held in position with respect to the helmet securement surface with a strap mounting loop not in engagement with the mounting hook.

One of the configurations of the present invention includes a design where the configuration of the main vertical upright 14 is planar. This configuration is shown in FIGS. 1 and 2. In some designs however, and especially where those are protruding constructions from the interior portion of the helmet, it is desired to provide an offset between the plane of the main vertical upright 14 and the position of the mounting hook 28. With this configuration as shown in FIGS. 3 through 6, an oblique section 58 is included in the upper end 16 of the main vertical upright 14. This oblique section 58 extends inwardly away from the environmental mounting surface to provide some additional clearance between a portion of the helmet 10 and the main vertical upright 14. This is often used when there are protruding constructions from the interior of the helmet such as adjustment mechanisms, strapping mechanisms, head liners and the like.

With the inclusion of the oblique section 58 as shown in FIGS. 3 through 6, a first mounting shoulder 60 will preferably be included fixedly secured to the first ear plate 30 and extending rearwardly therefrom toward the mounting surface to facilitate fixed securement of the upper portion of the main bracket 11 to the environmental structure. Preferably the first mounting shoulder 60 will define a first shoulder mounting aperture 62 therewithin to facilitate this mounting.

Similarly, a second mounting shoulder 64 can be included fixedly secured to the second ear plate 32 and extending inwardly therefrom toward the environmental mounting surface. Second mounting shoulder 64 is then preferably mounted to the environmental surface and preferably defines a second shoulder mounting aperture 66 for facilitating such attachment.

With the construction of the present invention, it provides a simple and speedy way for engaging a helmet with respect to the interior of the passenger compartment of a fire fighting vehicle which is secure, and yet allows quick removal once the emergency location is reached.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A mounting bracket assembly for positively retaining a helmet thereto, being particularly usable with helmets having an integrally configured mounting loop, said bracket assembly comprising:
   A. a main bracket means comprising:
      (1) a main vertical upright extending generally vertically, said main vertical upright defining an upper end and a lower end thereof, said main vertical upright at least partly defining an upright mounting surface for abutment with environmental structure responsive to the mounting bracket assembly being secured thereto and a helmet securement surface for receiving a helmet in abutment therewith responsive to retaining thereof by the mounting bracket assembly;
      (2) a lower crossmember attached with respect to said main vertical upright and extending laterally outwardly therefrom, said lower crossmember defining a first lateral end means and a second lateral end means spatially disposed from each other, said lower crossmember defining a portion of said helmet securement surface, said main vertical upright and said lower crossmember defining said helmet securement surface against which a helmet abuts responsive to mounting thereof;
      (3) a mounting hook attached to said upper end of said main vertical upright and extending upwardly and inwardly therefrom to facilitate hooking engagement therewith;
      (4) a first ear plate means attached to said upper end of said main vertical upright and extending laterally outwardly therefrom and upwardly adjacent said mounting hook;
      (5) a first bumper means attached to said first ear plate means and extending inwardly therefrom beyond the inward position of said inwardly extending mounting hook for enhancing protection therefrom;
      (6) a second ear plate means attached to said upper end of said main vertical upright and extending laterally outwardly therefrom and upwardly adjacent said mounting hook in a direction oppositely from said first ear plate means to facilitate positioning of said mounting hook therebetween;
      (7) a second bumper means attached to said second ear plate means and extending inwardly therefrom beyond the inward position of said inwardly extending mounting hook for enhancing protection therefrom;
   B. a securement strap assembly attachable to said main bracket means, said securement strap assembly comprising:
      (1) a primary loop means positionable extending around the helmet for positively engaging thereof;
      (2) a first attachment strap attached to said primary loop means and attached to said first lateral end means of said lower crossmember to facilitate selective abutment of the helmet against said helmet securement surface to facilitate engagement thereof with respect to said main bracket means; and
      (3) a second attachment strap attached to said primary loop means at a position thereon which is spatially disposed from said first attachment strap, said second attachment strap being attached to said second lateral end means of said lower crossmember to facilitate selective abutment of the helmet against said helmet securement surface to facilitate engagement thereof with respect to said main bracket means.

2. The mounting bracket assembly as defined in claim 1 wherein said mounting hook is attached to said upper end of said main vertical upright at a position immediately adjacent to a helmet mounting loop responsive to a helmet having a helmet mounting loop being selectively secured in abutment with said helmet securement surface, said mounting hook being adapted to receive the helmet mounting to loop secured thereto to further facilitate positive engagement of the helmet with respect to said main bracket means.

3. The mounting bracket assembly as defined in claim 1 wherein said securement strap assembly includes a strap mounting loop attached to said primary loop means of said securement strap assembly, said strap mounting loop means being engageable with respect to said mounting hook of said main bracket means to further facilitate secure mounting of a helmet in abutting engagement with respect to said helmet securement surface.

4. The mounting bracket assembly as defined in claim 3 wherein said strap mounting loop is made of metal.

5. The mounting bracket assembly as defined in claim 1 wherein said securement strap assembly further includes a mounting lanyard attached to said primary loop means to facilitate movement of said primary loop means into surrounding engagement with a helmet for retaining thereof.

6. The mounting bracket assembly as defined in claim 1 wherein said first lateral end means defines a first lateral attachment slot means and wherein said first attachment strap extends therethrough to facilitate securement thereof with respect to said first lateral end means of said lower crossmember, and further wherein said second lateral end means defines a second lateral attachment slot means and wherein said second attachment strap extends therethrough to facilitate securement thereof with respect to said second lateral end means of said lower crossmember.

7. The mounting bracket assembly as defined in claim 1 wherein said securement strap assembly includes a first adjustable buckle means attached to said first attachment strap to facilitate adjusting of the length of said first attachment strap to facilitate use with helmet of various sizes and configurations, and wherein said securement strap assembly includes a second adjustable buckle means attached to said second attachment strap to facilitate adjusting of the length of said second attachment strap to further facilitate use with helmet of various sizes and configurations.

8. The mounting bracket assembly as defined in claim 1 wherein said main bracket means defining a plurality of mounting apertures therein to facilitate mounting thereof with respect to environmental structure.

9. The mounting bracket assembly as defined in claim 1 wherein said first bumper means and said second bumper means are made of rubber.

10. The mounting bracket assembly as defined in claim 1 wherein said main vertical upright is completely planar.

11. The mounting bracket assembly as defined in claim 1 wherein said upper end of said main vertical upright includes an upwardly and inwardly extending oblique section to facilitate positioning of said mounting hook, said first ear plate means and said second ear plate means upwardly and inwardly with respect to said lower end of said main vertical upright to facilitate use with helmets having various different configurations.

12. The mounting bracket assembly as defined in claim 10 wherein said main bracket means includes a first mounting shoulder fixedly secured to said first ear plate means and extending outwardly therefrom to facilitate secure mounting thereof with respect to environmental structure and wherein said main bracket means further includes a second mounting shoulder fixedly secured to said second ear plate means and extending outwardly therefrom to further facilitate secure mounting thereof with respect to environmental structure.

13. The mounting bracket assembly as defined in claim 11 wherein said first mounting shoulder defines a first shoulder mounting aperture means therein to facilitate mounting thereof to environmental structure and wherein said second mounting shoulder defines a second shoulder mounting aperture means therein to facilitate mounting thereof to environmental structure.

14. The mounting bracket assembly as defined in claim 1 wherein said primary loop means of said securement strap assembly is formed of flexibly resilient material to facilitate biasing engagement of a helmet in abutment with respect to said helmet securement surface.

15. The mounting bracket assembly as defined in claim 1 wherein said first attachment strap and said second attachment strap are integrally formed with respect to at least a portion of said primary loop means.

16. The mounting bracket assembly as defined in claim 1 wherein said upright mounting surface and said helmet securement surface of said main vertical upright are oriented facing oppositely with respect to each other.

17. The mounting bracket assembly as defined in claim 1 wherein said first lateral end means and said second lateral end means of said lower crossmember are positioned extending oppositely from one another in a direction extending outwardly laterally from said lower end of said main vertical upright.

18. The mounting bracket assembly as defined in claim 1 wherein said mounting hook is attached to said upper end of said main vertical upright at a position immediately adjacent to a helmet mounting loop responsive to a helmet having a helmet mounting loop being selectively secured in abutment with said helmet securement surface, said mounting hook being adapted to receive the helmet mounting loop secured thereto to further facilitate positive engagement of the helmet with respect to said main bracket means, and further wherein said securement strap assembly includes a strap mounting loop attached to said primary loop means of said securement strap assembly, said strap mounting loop means being engageable with respect to said mounting hook of said main bracket means to further facilitate secure mounting of a helmet in abutting engagement with respect to said helmet securement surface, said mounting hook being adapted to receive said strap mounting loop and the helmet mounting loop in simultaneous engagement with respect thereto to positively locate the helmet in abutting engagement with respect to said helmet securement surface.

19. A mounting bracket assembly for positively retaining a helmet thereto, being particularly usable with helmets having an integrally configured mounting loop, said bracket assembly comprising:

A. a main bracket means comprising:
(1) a main vertical upright extending generally vertically, said main vertical upright defining an upper end and a lower end thereof, said main vertical upright defining an upright mounting surface for abutment with environmental structure responsive to the mounting bracket assembly being secured thereto and a helmet securement surface for receiving a helmet in abutment therewith responsive to retaining thereof by the mounting bracket assembly, said upright mounting surface and said helmet securement surface being oriented facing oppositely with respect to each other, said main vertical upright being completely planar;
(2) a lower crossmember attached with respect to said main vertical upright and extending laterally outwardly therefrom, said lower crossmember defining a first lateral end means and a second lateral end means spatially disposed from each other, said first lateral end means defining a first lateral attachment slot means and said second lateral end means defining a second lateral attachment slot means;
(3) a mounting hook attached to said upper end of said main vertical upright and extending upwardly and inwardly therefrom to facilitate hooking engagement therewith, said mounting hook being attached to said upper end of said main vertical upright at a position immediately adjacent to a helmet mounting loop responsive to use with a helmet having a helmet mounting loop being selectively secured in abutment with said helmet securement surface, said mounting hook being adapted to receive the helmet mounting loop secured thereto to further facilitate positive engagement of the helmet with respect to said main bracket means;
(4) a first ear plate means attached to said upper end of said main vertical upright and extending laterally outwardly therefrom and upwardly adjacent to said mounting hook;
(5) a first rubber bumper means attached to said first ear plate means and extending inwardly therefrom beyond the inward position of said inwardly extending mounting hook for enhancing protection therefrom;
(6) a second ear plate means attached to said upper end of said main vertical upright and extending laterally outwardly therefrom and upwardly adjacent said mounting hook in a direction oppositely oriented from said first ear plate means to facilitate positioning of said mounting hook therebetween;

(7) a second rubber bumper means attached to said second ear plate means and extending inwardly therefrom beyond the inward position of said inwardly extending mounting hook for enhancing protection therefrom;

B. a securement strap assembly attachable to said main bracket means, said securement strap assembly comprising:

(1) a primary loop means positionable extending around the helmet for positively engaging thereof, said primary loop means being formed of flexibly resilient material to facilitate biasing engagement of a helmet in abutment with respect to said helmet securement surface;

(2) a first attachment strap attached to said primary loop means and attached to said first lateral end means of said lower crossmember to facilitate selective abutment of the helmet against said helmet securement surface to facilitate engagement thereof with respect to said main bracket means, said first attachment strap extending through said first lateral attachment slot means to facilitate securement thereof with respect to said first lateral end means of said lower crossmember, said first attachment strap being integrally formed with respect to at least a portion of said primary loop means;

(3) a second attachment strap attached to said primary loop means at a position thereon which is spatially disposed from said first attachment strap, said second attachment strap being attached to said second lateral end means of said lower crossmember to facilitate selective abutment of the helmet against said helmet securement surface to facilitate engagement thereof with respect to said main bracket means, said second attachment strap extending through said second lateral attachment slot means to facilitate securement thereof with respect to said second lateral end means of said lower crossmember, said second attachment strap being integrally formed with respect to at least a portion of said primary loop means;

(4) a strap mounting loop made of metal attached to said primary loop means of said securement strap assembly, said strap mounting loop means being engageable with respect to said mounting hook of said main bracket means to further facilitate secure mounting of a helmet in abutting engagement with respect to said helmet securement surface, said primary loop means of said securement strap assembly being formed of flexibly resilient material to facilitate biasing engagement of a helmet in abutment with respect to said helmet securement surface, said mounting hook being adapted to receive said strap mounting loop and the helmet mounting loop in simultaneous engagement with respect thereto to positively locate the helmet in abutting engagement with respect to said helmet securement surface;

(5) a mounting lanyard attached to said primary loop means to facilitate movement of said primary loop means into surrounding engagement with a helmet for retaining thereof in abutment with respect to said helmet securement surface;

(6) a first adjustable buckle means attached to said first attachment strap to facilitate adjusting of the length of said first attachment strap to facilitate use with helmets of various sizes and configurations; and (7) a second adjustable buckle means attached to said second attachment strap to facilitate adjusting of the length of said second attachment strap to further facilitate use with helmets of various sizes and configurations.

20. A mounting bracket assembly for positively retaining a helmet thereto, being particularly usable with helmets having an integrally configured mounting loop, said bracket assembly comprising:

A. a main bracket means comprising:

(1) a main vertical upright extending generally vertically, said main vertical upright defining an upper end and a lower end thereof, said main vertical upright defining an upright mounting surface for abutment with environmental structure responsive to the mounting bracket assembly being secured thereto and a helmet securement surface for receiving a helmet in abutment therewith responsive to retaining thereof by the mounting bracket assembly, said upright mounting surface and said helmet securement surface being oriented facing oppositely with respect to each other, said upper end of said main vertical upright including an upwardly and inwardly extending oblique section;

(2) a lower crossmember attached with respect to said main vertical upright and extending laterally outwardly therefrom, said lower crossmember defining a first lateral end means and a second lateral end means spatially disposed from each other, said first lateral end means defining a first lateral attachment slot means and said second lateral end means defining a second lateral attachment slot means;

(3) a mounting hook attached to said upper end of said main vertical upright and extending upwardly and inwardly therefrom to facilitate hooking engagement therewith, said mounting hook being attached to said upper end of said main vertical upright at a position immediately adjacent to a helmet mounting loop responsive to a helmet having a helmet mounting loop being selectively secured in abutment with said helmet securement surface, said mounting hook being adapted to receive the helmet mounting loop secured thereto to further facilitate positive engagement of the helmet with respect to said main bracket means, said mounting hook being attached to said oblique section of said upper end of said main vertical upright in order to facilitate use thereof with helmets having various different configurations;

(4) a first ear plate means attached to said upper end of said main vertical upright and extending laterally outwardly therefrom and upwardly adjacent said mounting hook, said first ear plate means being attached to said oblique section of said upper end of said main vertical upright in order to facilitate use thereof with helmets having various different configurations;

(5) a first rubber bumper means attached to said first ear plate means and extending inwardly therefrom beyond the inward position of said inwardly extending mounting hook for enhancing protection therefrom;

(6) a second ear plate means attached to said upper end of said main vertical upright and extending laterally outwardly therefrom and upwardly adjacent said mounting hook in a direction oppositely from said first ear plate means to facilitate positioning of said mounting hook therebetween, said second ear plate means being attached to said oblique section of said upper end of said main vertical upright in order to facilitate use thereof with helmets having various different configurations;

(7) a second rubber bumper means attached to said second ear plate means and extending inwardly therefrom beyond the inward position of said inwardly extending mounting hook for enhancing protection therefrom;

(8) a first mounting shoulder fixedly secured to said first ear plate means and extending outwardly therefrom to facilitate secure mounting thereof with respect to environmental structure, said first mounting shoulder defining a first shoulder mounting aperture means therein to facilitate mounting thereof to environmental structure;

(9) a second mounting shoulder fixedly secured to said second ear plate means and extending outwardly therefrom to further facilitate secure mounting thereof with respect to environmental structure, said second mounting shoulder defining a first shoulder mounting aperture means therein to facilitate mounting thereof to environmental structure;

B. a securement strap assembly attachable to said main bracket means, said securement strap assembly comprising:

(1) a primary loop means positionable extending around the helmet for positively engaging thereof, said primary loop means being formed of flexibly resilient material to facilitate biasing engagement of a helmet in abutment with respect to said helmet securement surface;

(2) a first attachment strap attached to said primary loop means and attached to said first lateral end means of said lower crossmember to facilitate selective abutment of the helmet against said helmet securement surface to facilitate engagement thereof with respect to said main bracket means, said first attachment strap extending through said first lateral attachment slot means to facilitate securement thereof with respect to said first lateral end means of said lower crossmember, said first attachment strap being integrally formed with respect to at least a portion of said primary loop means;

(3) a second attachment strap attached to said primary loop means at a position thereon which is spatially disposed from said first attachment strap, said second attachment strap being attached to said second lateral end means of said lower crossmember to facilitate selective abutment of the helmet against said helmet securement surface to facilitate engagement thereof with respect to said main bracket means, said second attachment strap extending through said second lateral attachment slot means to facilitate securement thereof with respect to said second lateral end means of said lower crossmember, said second attachment strap being integrally formed with respect to at least a portion of said primary loop means;

(4) a strap mounting loop made of metal attached to said primary loop means of said securement strap assembly, said strap mounting loop means being engageable with respect to said mounting hook of said main bracket means to further facilitate secure mounting of a helmet in abutting engagement with respect to said helmet securement surface, said primary loop means of said securement strap assembly being formed of flexibly resilient material to facilitate biasing engagement of a helmet in abutment with respect to said helmet securement surface, said mounting hook being adapted to receive said strap mounting loop and the helmet mounting loop in simultaneous engagement with respect thereto to positively locate the helmet in abutting engagement with respect to said helmet securement surface;

(5) a mounting lanyard attached to said primary loop means to facilitate movement of said primary loop means into surrounding engagement with a helmet for retaining thereof in abutment with respect to said helmets securement surface;

(6) a first adjustable buckle means attached to said first attachment strap to facilitate adjusting of the length of said first attachment strap to facilitate use with helmet of various sizes and configurations; and (7) a second adjustable buckle means attached to said second attachment strap to facilitate adjusting of the length of said second attachment strap to further facilitate use with helmets of various sizes and configurations.

* * * * *